UNITED STATES PATENT OFFICE.

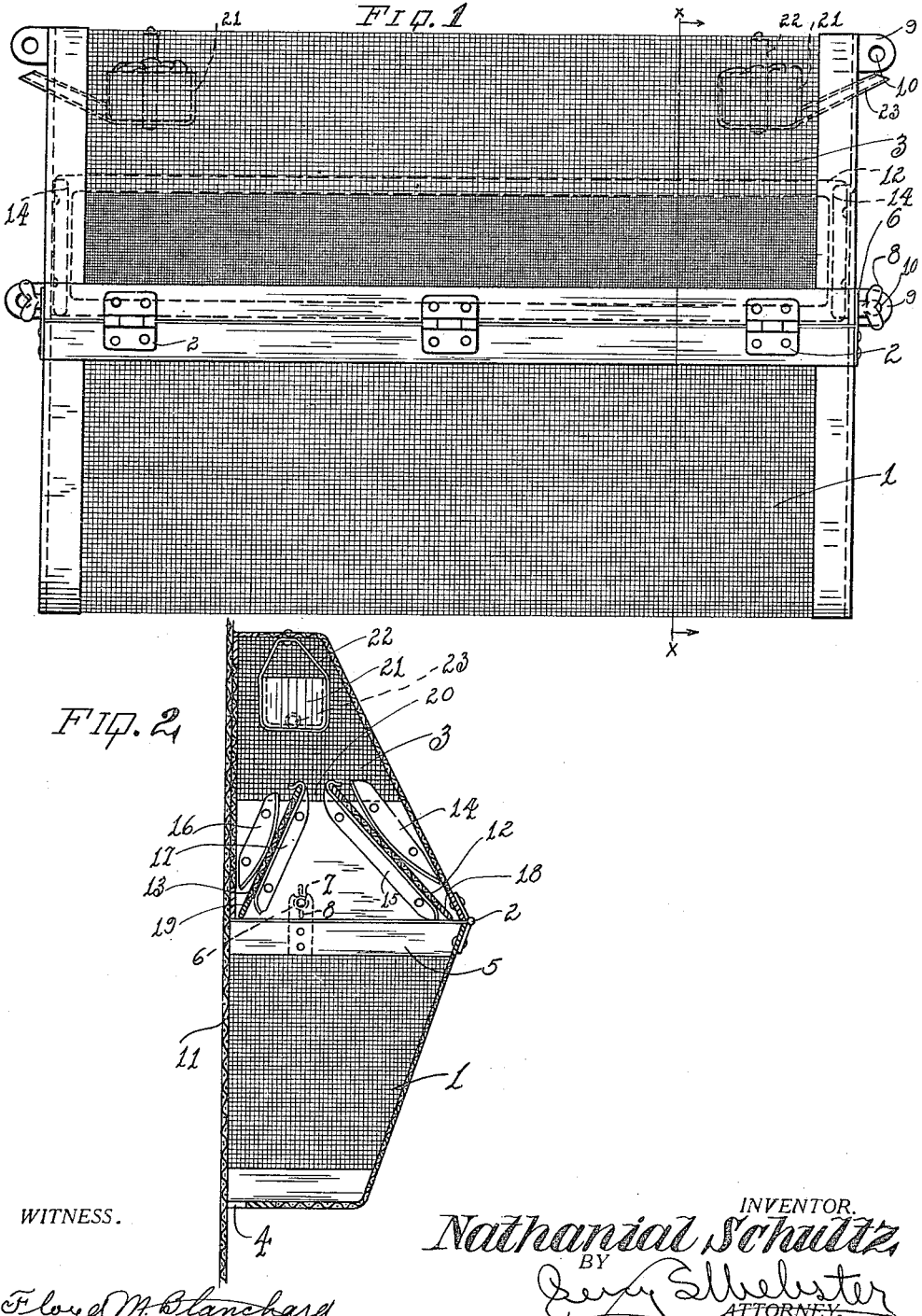

NATHANIAL SCHULTZ, OF STOCKTON, CALIFORNIA.

FLY-EXTERMINATOR.

1,212,407.  Specification of Letters Patent.  Patented Jan. 16, 1917.

Application filed May 20, 1916. Serial No. 98,794.

*To all whom it may concern:*

Be it known that I, NATHANIAL SCHULTZ, a citizen of the United States, residing at Stockton, in the county of San Joaquin, State of California, have invented certain new and useful Improvements in Fly-Exterminators; and I do declare the following to be a full, clear, and exact description of the same, reference being had to the accompanying drawings, and to the characters of reference marked thereon, which form a part of this application.

This invention relates to improvements in a means for ridding a building or other place from the insect pest, the object of the invention being to so construct a trap for use on doors or windows so that the trap will catch any and all insects that may crawl into the same.

A further object of the invention is to provide a means for readily removing the dead insects from the trap after they have been caught therein.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a front elevation of the fly exterminator. Fig. 2 is a cross section taken upon a line X—X of Fig. 1.

Referring now more particularly to the characters of reference on the drawings, the numeral 1 designates the lower V-shaped compartment of the trap, and fastened thereto by hinges 2 I have provided an upper compartment 3 of substantially the same shape but in an inverted position. The lower compartment 1 will be screened all around as shown and will have at a point 4 an opening the full width of the trap. Fastened to a top supporting member 5 of the compartment 1 I have provided upon either end thereof an upstanding bracket 6 having a slot 7 which will, when the compartment 1 is swung up into its normal position, register with a wing nut 8, which, when screwed down against the said bracket 6, will hold the compartment 1 in the position as shown in the drawing. The compartment 3 has projecting at four points as at 9, outstanding lugs provided with holes 10 so that the trap may be fastened against the screen or window. In the Fig. 2, this is represented as at 11 showing the trap resting against a section of screen.

Within the compartment 3 I have arranged slides 12 and 13 respectively which are held in position by means of guides 14, 15, and 16 and 17 respectively. The slides 12 and 13 will be made of screen the same as the outside of the trap but will have a frame member running around the outside thereof as shown at 18 and 19 respectively. It will be noticed that the guides 14 and 16 are curved so that the frames when pushed into place will bear against such guides only at one point thereby eliminating much of the friction but at the same time producing a guide which will hold the said frames rigidly in position.

The guides are so arranged upon an angle that there will be a slight opening 20 at the top thereof which will be the full width of the trap and will lead into the top of the compartment 3 wherein at either end I have provided poison containing cups 21. These cups will be held in position by means of hangers 22 and will have projecting through the side of the trap a spout 23 which will conduct a liquid to the interior of the cup without removing the same from the compartment. The insect upon entering the trap through the slot 4 will move upwardly through the slot 20 and to the top of the compartment 3 where it will come into contact with one of the poison containing cups and then drop down into the trap behind either one of the aforementioned slides.

Upon the trap becoming full of dead insects it will be very easy to clean the same as the bottom compartment 1 may be swung backward and the slides then quickly and easily removed, and again replaced. The trap will preferably be located near the top of a screen door or a window and after once being put into position, will not have to be taken down to be cleaned.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:—

1. A device of the character described comprising two cage sections hinged together in inverted relation to each other, the lower section having an entrance opening opposite the hinged end, the upper section being provided with removably inclined slides spaced apart at their upper ends to form an entrance from the lower section to the upper section, such slides being arranged to be removed when the lower section is opened on its hinges to allow the upper section to be cleaned.

2. A device of the character described comprising two cage sections hinged together in inverted relation to each other, the lower section having an entrance opening opposite the hinged end, inclined guides disposed in the upper section arranged in pairs, one guide of each pair being straight and the opposite guide being curved, slides arranged to be frictionally engaged between the guides, the upper ends of the slides being spaced apart to form an entrance from the lower to the upper sections, such slides being adapted to be removed when the lower section is opened on its hinges to allow the upper section to be cleaned.

In testimony whereof I affix my signature.

NATHANIAL SCHULTZ.

Copies of this patent may be obtained for five cents each, by addressing the "Commissioner of Patents, Washington, D. C."